（12）United States Patent
Savitsky et al.

(10) Patent No.: US 10,380,920 B2
(45) Date of Patent: Aug. 13, 2019

(54) SYSTEM AND METHOD FOR AUGMENTED ULTRASOUND SIMULATION USING FLEXIBLE TOUCH SENSITIVE SURFACES

(71) Applicant: SonoSim, Inc., Santa Monica, CA (US)

(72) Inventors: Eric Savitsky, Malibu, CA (US); Gabriele Nataneli, Los Angeles, CA (US); Dan Katz, Encino, CA (US)

(73) Assignee: SONOSIM, INC., Santa Monica, CA (US)

(*) Notice: Subject to any disclaimer, the term of this patent is extended or adjusted under 35 U.S.C. 154(b) by 1157 days.

(21) Appl. No.: 14/622,490

(22) Filed: Feb. 13, 2015

(65) Prior Publication Data

US 2015/0154890 A1 Jun. 4, 2015

Related U.S. Application Data

(63) Continuation-in-part of application No. 14/548,210, filed on Nov. 19, 2014, and a continuation-in-part of application No. 14/494,379, filed on Sep. 23, 2014, now abandoned.

(60) Provisional application No. 61/907,276, filed on Nov. 21, 2013, provisional application No. 61/881,338, filed on Sep. 23, 2013, provisional application No. 61/946,646, filed on Feb. 28, 2014, provisional application No. 61/946,586, filed on Feb. 28, 2014.

(51) Int. Cl.
*G09B 23/28* (2006.01)

(52) U.S. Cl.
CPC ................... *G09B 23/286* (2013.01)

(58) Field of Classification Search
CPC .............................. G09B 23/286; G09B 23/28
See application file for complete search history.

(56) References Cited

U.S. PATENT DOCUMENTS

| 5,609,485 | A | 3/1997 | Bergman |
| 6,193,657 | B1 | 2/2001 | Drapkin |
| 6,502,756 | B1 | 1/2003 | Fåhraeus |
| 6,548,768 | B1 | 4/2003 | Pettersson |

(Continued)

FOREIGN PATENT DOCUMENTS

EP 2801966 11/2014

OTHER PUBLICATIONS

Chung, Gregory, "Effects of Simulation-Based Practice on Focused Assessment . . . ", Military Medicine, Oct. 2013, vol. 178.

(Continued)

*Primary Examiner* — Eddy Saint-Vil
(74) *Attorney, Agent, or Firm* — Cislo & Thomas, LLP

(57) ABSTRACT

A method and system for ultrasound simulation for training purposes. The system comprises a probe assembly, an electronic tag, and a translation sensor. The probe assembly comprises an orientation sensor to detect movement with three degrees of freedom. The translation sensor offers two additional degrees of freedom of movement detection. The probe assembly also has a transponder reader that when placed adjacent to the electronic tag, can communicate with a transponder within the electronic tag. Electronic tag has adhesive that allows the electronic tag to be a fixed to a subject, whether a live being or an inanimate mannequin. The information collected from the transponder is transmitted to the computing device to provide a simulated environment that mimics the use of an actual ultrasound probe to give the user a realistic experience using an ultrasound machine.

18 Claims, 6 Drawing Sheets

(56) References Cited

U.S. PATENT DOCUMENTS

| | | |
|---|---|---|
| 6,570,104 B1 | 5/2003 | Ericson et al. |
| 6,663,008 B1 | 12/2003 | Pettersson et al. |
| 6,666,376 B1 | 12/2003 | Ericson |
| 6,667,695 B2 | 12/2003 | Pettersson et al. |
| 6,674,427 B1 | 1/2004 | Pettersson et al. |
| 6,689,966 B2 | 2/2004 | Wiebe |
| 6,698,660 B2 | 3/2004 | Fåhraeus et al. |
| 6,719,470 B2 | 4/2004 | Berhin |
| 6,722,574 B2 | 4/2004 | Skantze et al. |
| 6,732,927 B2 | 5/2004 | Olsson et al. |
| 6,836,555 B2 | 12/2004 | Ericson et al. |
| 6,854,821 B2 | 2/2005 | Ericson et al. |
| 6,864,880 B2 | 3/2005 | Hugosson et al. |
| 6,878,062 B2 | 4/2005 | Bjorklund et al. |
| 6,927,916 B2 | 8/2005 | Craven-Bartle |
| 6,929,183 B2 | 8/2005 | Pettersson |
| 6,929,481 B1 | 8/2005 | Alexander |
| 6,947,033 B2 | 9/2005 | Fåhraeus et al. |
| 6,958,747 B2 | 10/2005 | Sahlberg et al. |
| 6,966,495 B2 | 11/2005 | Lynggaard et al. |
| 6,992,655 B2 | 1/2006 | Ericson et al. |
| 7,002,559 B2 | 2/2006 | Ericson |
| 7,035,429 B2 | 4/2006 | Andreasson |
| 7,050,653 B2 | 5/2006 | Edso et al. |
| 7,054,487 B2 | 5/2006 | Ericson et al. |
| 7,072,529 B2 | 7/2006 | Hugosson et al. |
| 7,089,308 B2 | 8/2006 | Fransson et al. |
| 7,094,977 B2 | 8/2006 | Ericson et al. |
| 7,110,604 B2 | 9/2006 | Olsson |
| 7,120,320 B2 | 10/2006 | Petterson et al. |
| 7,121,465 B2 | 10/2006 | Rignell |
| 7,127,682 B2 | 10/2006 | Sandstrom et al. |
| 7,143,952 B2 | 12/2006 | Ericson |
| 7,145,556 B2 | 12/2006 | Pettersson |
| 7,154,056 B2 | 12/2006 | Bergqvist et al. |
| 7,162,087 B2 | 1/2007 | Bryborn |
| 7,167,164 B2 | 1/2007 | Ericson et al. |
| 7,172,131 B2 | 2/2007 | Pettersson et al. |
| 7,175,095 B2 | 2/2007 | Pettersson et al. |
| 7,176,896 B1 | 2/2007 | Fahraeus et al. |
| 7,180,509 B2 | 2/2007 | Fermgard et al. |
| 7,195,166 B2 | 3/2007 | Olsson et al. |
| 7,202,861 B2 | 4/2007 | Lynggaard |
| 7,202,963 B2 | 4/2007 | Wiebe et al. |
| 7,239,306 B2 | 7/2007 | Fahraeus et al. |
| 7,246,321 B2 | 7/2007 | Bryborn et al. |
| 7,248,250 B2 | 7/2007 | Pettersson et al. |
| 7,249,256 B2 | 7/2007 | Hansen et al. |
| 7,249,716 B2 | 7/2007 | Bryborn |
| 7,254,839 B2 | 8/2007 | Fahraeus et al. |
| 7,278,017 B2 | 10/2007 | Skantze |
| 7,281,668 B2 | 10/2007 | Pettersson et al. |
| 7,283,676 B2 | 10/2007 | Olsson |
| 7,293,697 B2 | 11/2007 | Wiebe et al. |
| 7,295,193 B2 | 11/2007 | Fahraeus |
| 7,296,075 B2 | 11/2007 | Lynggaard |
| 7,321,692 B2 | 1/2008 | Bryborn et al. |
| 7,333,947 B2 | 2/2008 | Wiebe |
| 7,345,673 B2 | 3/2008 | Ericson et al. |
| 7,353,393 B2 | 4/2008 | Hansen et al. |
| 7,356,012 B2 | 4/2008 | Wiebe et al. |
| 7,382,361 B2 | 6/2008 | Burstrom et al. |
| 7,385,595 B2 | 6/2008 | Bryborn et al. |
| 7,408,536 B2 | 8/2008 | Hugosson et al. |
| 7,415,501 B2 | 8/2008 | Burstrom et al. |
| 7,418,160 B2 | 8/2008 | Lynggaard |
| 7,422,154 B2 | 9/2008 | Ericson |
| 7,441,183 B2 | 10/2008 | Burstrom et al. |
| 7,457,413 B2 | 11/2008 | Thuvesholmen et al. |
| 7,457,476 B2 | 11/2008 | Olsson |
| 7,543,753 B2 | 6/2009 | Pettersson |
| 7,588,191 B2 | 9/2009 | Pettersson et al. |
| 7,600,693 B2 | 10/2009 | Pettersson |
| 7,649,637 B2 | 1/2010 | Wiebe et al. |
| 7,670,070 B2 | 3/2010 | Craven-Bartle |
| 7,672,513 B2 | 3/2010 | Bjorklund et al. |
| 7,701,446 B2 | 4/2010 | Sahlberg et al. |
| 7,710,408 B2 | 5/2010 | Ericson |
| 7,751,089 B2 | 7/2010 | Fahraeus et al. |
| 7,753,283 B2 | 7/2010 | Lynggaard |
| 7,788,315 B2 | 8/2010 | Johansson |
| 7,806,696 B2 | 10/2010 | Alexander |
| 7,833,018 B2 | 11/2010 | Alexander |
| 7,871,850 B2 | 1/2011 | Park |
| 7,931,470 B2 | 4/2011 | Alexander |
| 8,244,506 B2 | 8/2012 | Butsev |
| 8,294,972 B2 | 10/2012 | Chung |
| 8,428,326 B2 | 4/2013 | Falk |
| 8,480,406 B2 | 7/2013 | Alexander |
| 8,721,344 B2 | 5/2014 | Marmaropoulos |
| 2002/0088926 A1 | 7/2002 | Prasser |
| 2009/0130642 A1 | 5/2009 | Tada |
| 2010/0179428 A1* | 7/2010 | Pedersen .................. A61B 8/00 600/443 |
| 2013/0065211 A1 | 3/2013 | Amso |

* cited by examiner

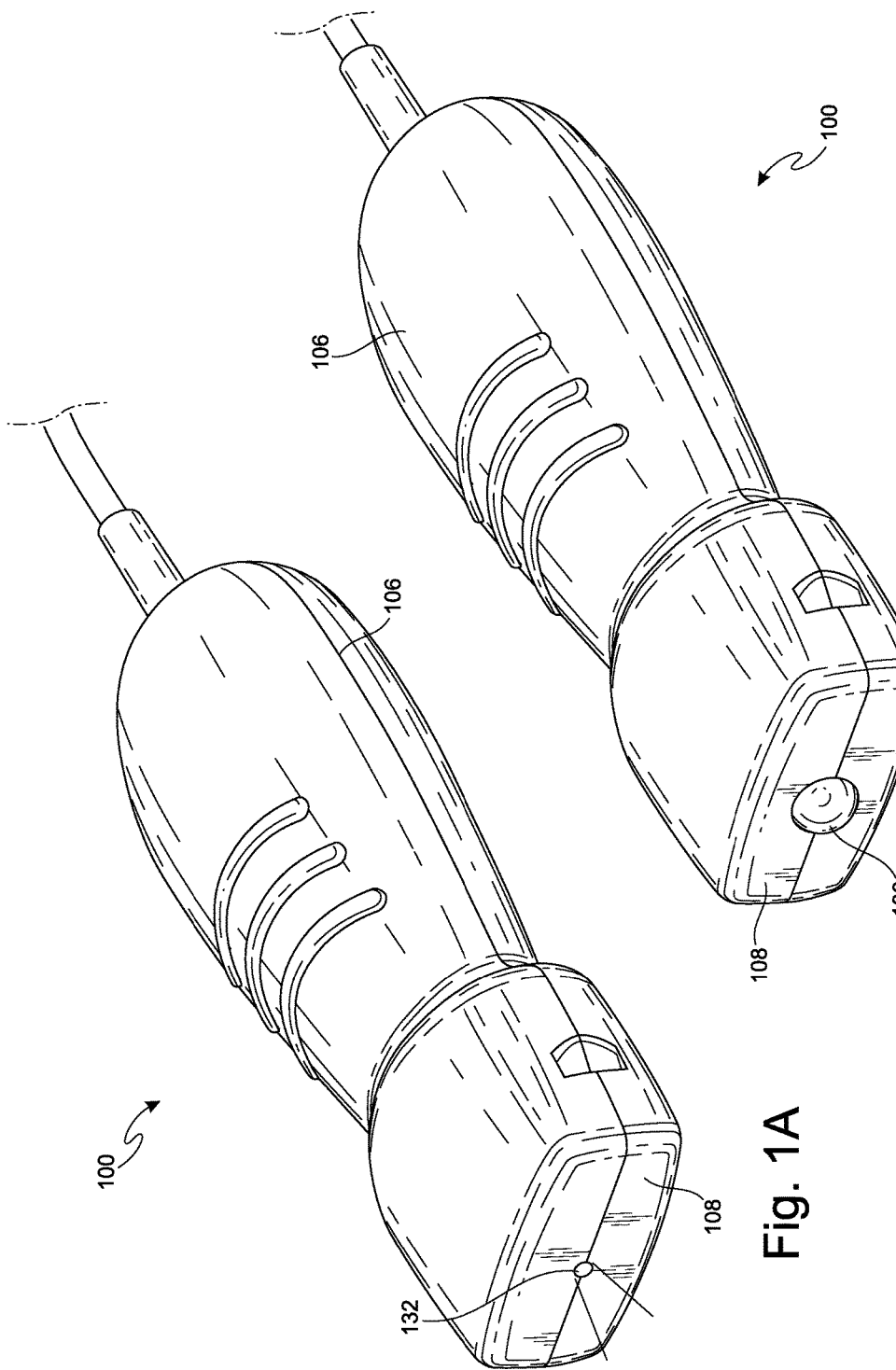

SYSTEM AND METHOD FOR AUGMENTED ULTRASOUND SIMULATION USING FLEXIBLE TOUCH SENSITIVE SURFACES

This patent application is a continuation-in-part of U.S. patent application Ser. No. 14/548,210 filed Nov. 19, 2014, which claims the benefit of U.S. Provisional Application No. 61/907,276 filed Nov. 21, 2013; this application is also a continuation-in-part of U.S. patent application Ser. No. 14/494,379, filed Sep. 23, 2014, which claims the benefit of U.S. Provisional Application No. 61/881,338, filed Sep. 23, 2013; this application also claims the benefit of U.S. Provisional Patent Application Ser. Nos. 61/946,646 and 61/946,586, each entitled "System and Method for Augmented Ultrasound Simulation Using Flexible Display Surfaces," and each filed Feb. 28, 2014, which applications are incorporated in their entirety here by this reference.

TECHNICAL FIELD

This invention is related to ultrasound simulators.

BACKGROUND

A variety of task-specific ultrasound simulators are currently available. These ultrasound simulators typically present a library of ultrasound cases to the user, and provide various mechanisms to navigate and interact with either simulated or real ultrasound data. In most cases, the ultrasound training solution includes a sensor device shaped like an ultrasound probe that reacts to motion, and controls a scanning plane in a simulated ultrasound-scanning environment. The simulators must be accurate enough to capture nuanced motions, and must integrate well with an intuitive user interface to convey a plausible experience of how to operate a real ultrasound machine on a real patient.

Some current mannequin-based, ultrasound simulators provide the ability to track simulated probe movement over six degrees of freedom (6-DOF). The limitations of such mannequin-based, task-specific ultrasound simulators include the physical footprint of the simulators (very large and bulky), cost, fidelity (sensor drift that requires frequent recalibration), and verisimilitude (limited realism owing to computer graphic imagery). These simulators can only be used in conjunction with the overlying mannequin that contains the embedded sensing equipment associated with the simulator. A high fidelity, economical, ultrasound training solution using real ultrasound imagery does exist, the SonoSim® Ultrasound Training Solution. While highly realistic and cost-effective, this training solution only provides continuous ultrasound probe tracking and simulation over 3-DOF. It does not continuously track handheld probe translational movement.

In summary, important needed improvements to the state-of-the-art of ultrasound simulation include: creating the capability to reliably, precisely, and continuously track translational movement of a simulated ultrasound probe independent of an electronic training mannequin with embedded motion tracking hardware, integrating the ability to continuously track 5-DOF simulated ultrasound probe movement into a holistic ultrasound training solution that does not mandate integration with an electronic training mannequin with embedded motion tracking hardware, and creating the ability to practice ultrasound simulation using live volunteers, rather than solely relying upon expensive electronic training mannequins with embedded software and hardware.

SUMMARY

This invention, a system and method for augmented ultrasound simulation using flexible touch sensitive surfaces, will extend the 3-DOF probe tracking capabilities of the SonoSim® Ultrasound Training Solution to include 5-DOF of ultrasound probe tracking. It creates the ability to reliably, precisely, and continuously track translational movement of a simulated ultrasound probe independent of an electronic training mannequin containing embedded motion tracking hardware. This invention integrates and expands the capabilities of the SonoSim® Ultrasound Training Solution. In the process, it simultaneously provides the ability to continuously track 5-DOF simulated ultrasound probe movement in the context of a holistic ultrasound training solution that does not mandate integration with an electronic training mannequin with embedded motion tracking hardware.

Presented here is an invention that combines widely available components for Radio Frequency Identification (RFID) and MEMS sensors with advances in flexible electronics to produce an easy-to-use, low-cost controller for ultrasound training software. This invention will extend the capabilities of the SonoSim® Ultrasound Training Solution to include reliable, precise, and continuous 5-DOF simulated ultrasound probe movement. It also provides a flexible ultrasound training solution that can be integrated in live volunteers as well as mannequin-based ultrasound training scenarios Importantly, it does not need to be embedded within training mannequins and is designed to easily be affixed to external mannequin or live volunteer body surfaces.

DRAWINGS

FIGS. 1A-1B show perspective views of embodiments of the present invention.

DETAILED DESCRIPTION OF THE INVENTION

Figure 1C:
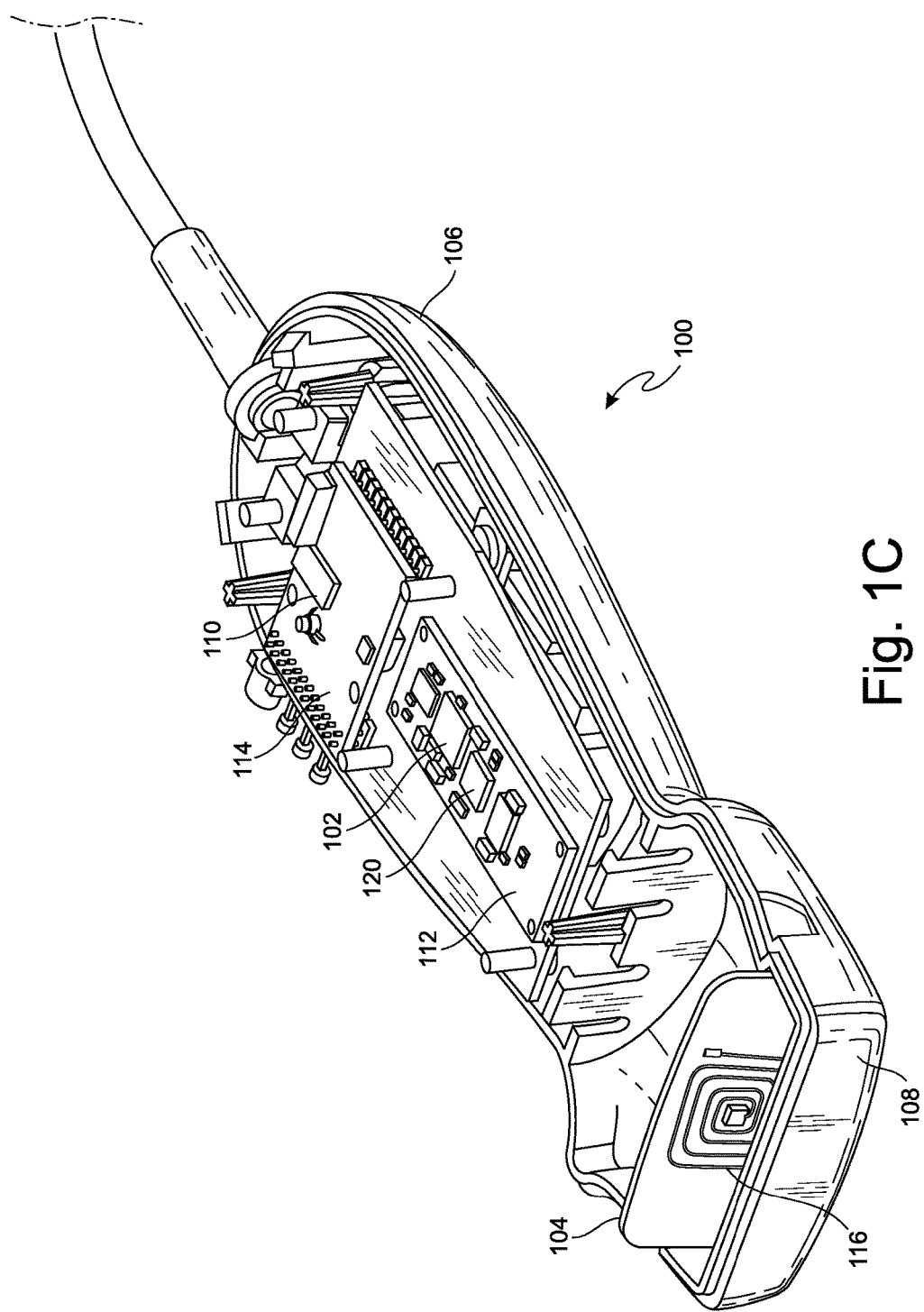
FIG. 1C shows a perspective view of another embodiment of the present invention with a portion of the housing removed to show the inside.
Figure 1D:
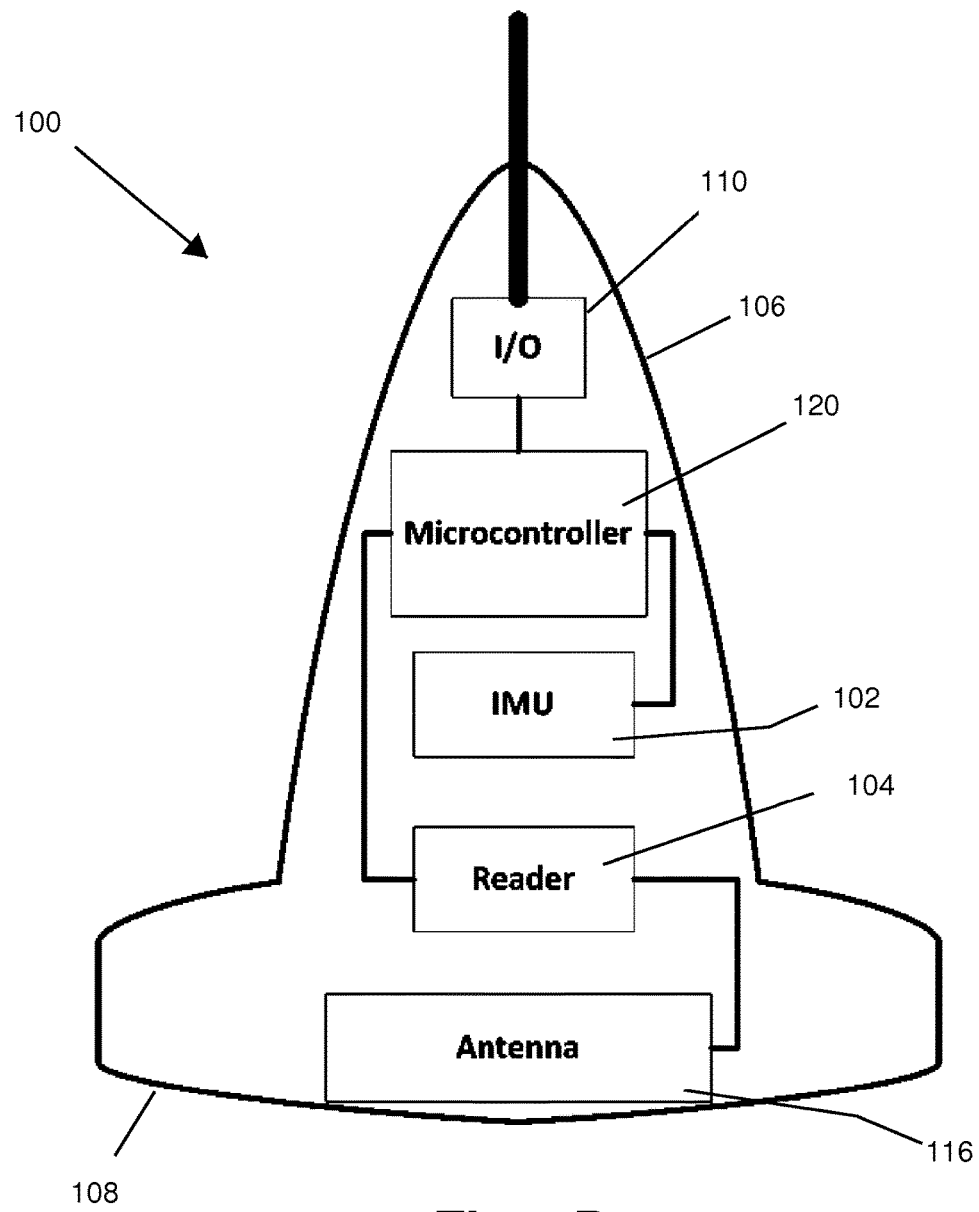
FIG. 1D shows a high-level schematic diagram of the probe assembly.

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. It is to be understood, however, that the same or equivalent functions and sequences may be accomplished by different embodiments that are also intended to be encompassed within the spirit and scope of the invention.

The present invention is a system for simulating ultrasound use comprising a probe assembly 100 having an orientation sensor 102 and a transponder reader 104; an electronic tag 200 having a transponder layer 202 containing a transponder 206; and a translation sensor 300. The probe assembly 100 is essentially a housing having a handle 106 and a tip 108 connected to the handle 106 so as to mimic an actual ultrasound probe. The electronic tag 200 is attachable to a body 12 of a subject 10, such as a mannequin or a live individual, and contains the transponder 206 to transmit information to the transponder reader 104 housed in the probe assembly 100. The translation sensor 300 is preferably in the form of a patch 302 that can be applied to the body 12, preferably over the electronic tag 200, to provide translation information of the probe assembly 100 when the probe assembly 100 is moved along the patch 302.

In the preferred embodiment, the transponder 206 may be an RFID, NFC, or similarly capable transponder coupled with an adhesive layer 204 and a built-in or external antenna 116. The orientation sensor 102 may be a 3-DOF MEMS Inertial Measurement Unit (IMU). The translation sensor 300 may be a patch 302 having a flexible touch-sensitive surface, with an optional flexible display 304 bonded with the flexible touch-sensitive surface. The probe assembly 100 may further comprise a wired or wireless communication interface 110 to communicate with a separate computing device 400 (e.g., PC, tablet, or dedicated unit). The computing device 400 can run an ultrasound simulation software and can communicate with the other components through the wired or wireless communication interface 110.

The Probe Assembly

As shown in FIGS. 1A-1D, in the preferred embodiment the probe assembly 100 comprises a housing that resembles a real ultrasound probe so as to mimic the use of an actual ultrasound probe by the user. As such, the housing comprises a handle 106 and a tip 108. Contained within the housing is one or more electronic boards 112, 114 with electronic components used to sense the orientation of the probe assembly 100, communicate with an electronic tag 200, communicate with a computing device 400, and process information, such as information regarding its orientation and information received from the electronic tag 200 and/or translation sensor 300. For example, the probe assembly 100 may contain an orientation sensor 102, a transponder reader 104, an antenna 116 positioned at the tip of the probe 100, a microcontroller 120, and a communication interface 110 (e.g., USB or Bluetooth).

In the preferred embodiment, the orientation sensor 102 may be an inertial measurement unit (IMU) measuring three degrees of freedom to detect the orientation of the probe assembly 100 with respect to the gravity vector. Yaw, pitch, and roll angles of the probe assembly 100 measured over time may correspond to fundamental motions that a sonographer is trained to perform in clinical practice: e.g., fanning, rocking, and rolling. This orientation sensor 102 relays the readings of orientation to the computing device 400 to drive the orientation of the scanning plane in a simulated environment 402 run by the computing device 400.

Orientation can also be measured using other operating principles, such as electromagnetic, optical, or mechanical. The orientation sensor 102 must be secured within the probe assembly 100 at a fixed rotation with respect to the housing.

The reader 104 or interrogator is a radio device that broadcasts electromagnetic (EM) waves at a pre-determined frequency. The frequency induces a current in small transponders 206 located a short distance away through magnetic induction. The transponder 206 uses the harvested power to broadcast a response over the air according to a pre-determined protocol. For the application discussed in this invention, the interaction between the reader 104 and the transponders 206 is preferably limited to a distance of 1-2 cm. Typical readers 104 that are suited for this invention operate either in the range of about 125 kHz (Low Frequency) or in the range of about 13.56 MHz (high frequency).

The reader 104 is integrated within the probe assembly 100. Preferably, to simulate the use of an actual ultrasound probe, the antenna element 116 of the reader 104 should be placed at the tip 108 of the probe assembly 100 so as to be placed in close proximity to a transponder layer 202 during use. Alternatively, if the reader component 104 is small enough, the entire reader board with an embedded antenna 116 can be placed at the tip 108 of the probe assembly 100. In the preferred embodiment, the reader 104 may be an RFID reader that matches these specifications.

The Electronic Tag

In the following the term RFID refers to a range of technologies that use radio frequency signals to query remotely located transponders. This includes the popular near field communication ("NFC") standard and other analogous technologies with similar capabilities known to those skilled in the art.

Figure 2:
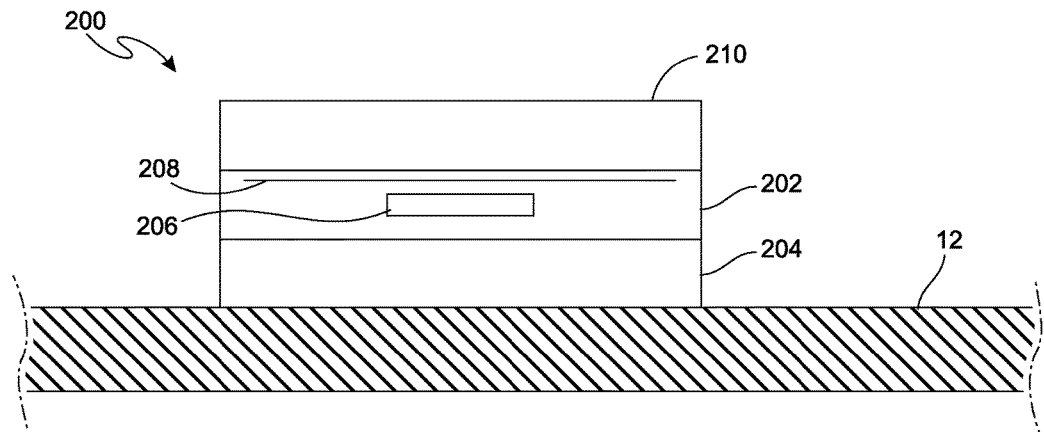
FIG. 2 shows a side view of a schematic diagram of an embodiment of the electronic tag.

As shown in FIG. 2, each electronic tag 200 comprises a transponder layer 202 and an adhesive layer 204 affixed to the transponder layer 202. The adhesive layer 204 allows the electronic tag 200 to be affixed onto a body 12 of a subject 10. The adhesive layer 204 must be chosen to bond well with the surface it will be applied on (skin, cloth, or plastic). Additionally, if the adhesive 204 is placed on skin it should also be certified to be hypoallergenic and not cause skin irritation.

The transponder layer 202 may comprise a transponder 206 associated with a memory for storing and processing information, as well as performing other standard functions of a transponder, and an antenna element 208 (e.g., an inductive coil) to transmit that signals to the reader 104 and receive signals from the reader 104.

The information contained in the transponder 206 pertains to the identification of the transponder 206 and its associated, specific anatomical body part. The transponder 206 may also contain information that implements a pre-determined protocol. This information can be transmitted to a computing device 400 and used in creating a simulated environment 402. In particular, this information will help create ultrasound images 404 of a particular body part being scanned with the probe assembly 100 so as to mimic what a user would see if the user were to scan that body part of a live subject in the same manner as with an actual ultrasound probe.

As an alternative to RFID or NFC readers, the transponder 206 may be a Bluetooth beacon, which is a beacon using Bluetooth Low Energy (BLE) technology. BLE Beacons are active tags that continuously broadcast a signal using the BLE transceiver, and a built-in battery for power. To accommodate BLE Beacons the probe assembly 100 must integrate a Bluetooth Low Energy transceiver that can detect the presence of BLE Beacons and estimate their distance by measuring the Received Signal Strength Indicator (RSSI).

In some embodiments, the electronic tag 200 may further comprise a surface layer 210 placed on top of the transponder layer 202 to sandwich the transponder layer 202 in between the surface layer 210 and the adhesive layer 204. The surface layer 210 may display an identifier 212 to let the user know to which anatomical body part the electronic tag pertains. For example, the surface layer 210 may be made of a protective material (plastic, paper, a film, and the like), and may depict a number, a character, or a custom graphic representing an anatomical body part. By identifying the electronic tag 200, the user will know where on the subject 10 to place the electronic tag 200.

Localization and RFID

Figure 4A:
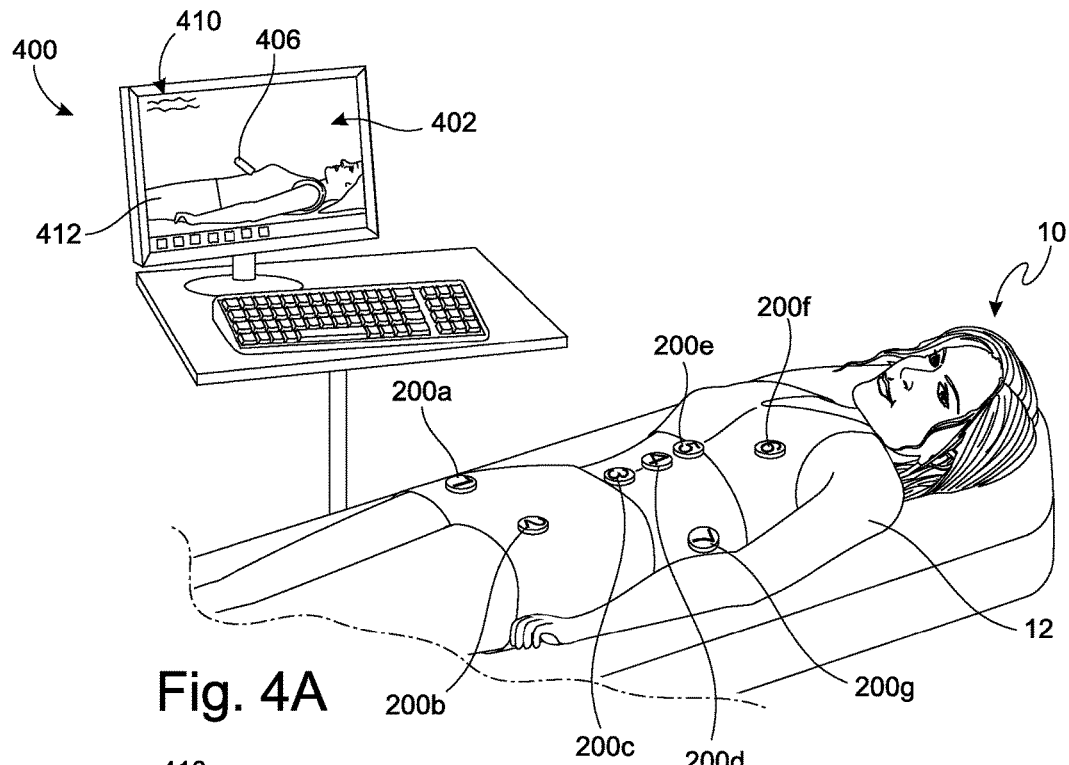
FIGS. 4A-4B show the system in use.
Figure 4B:
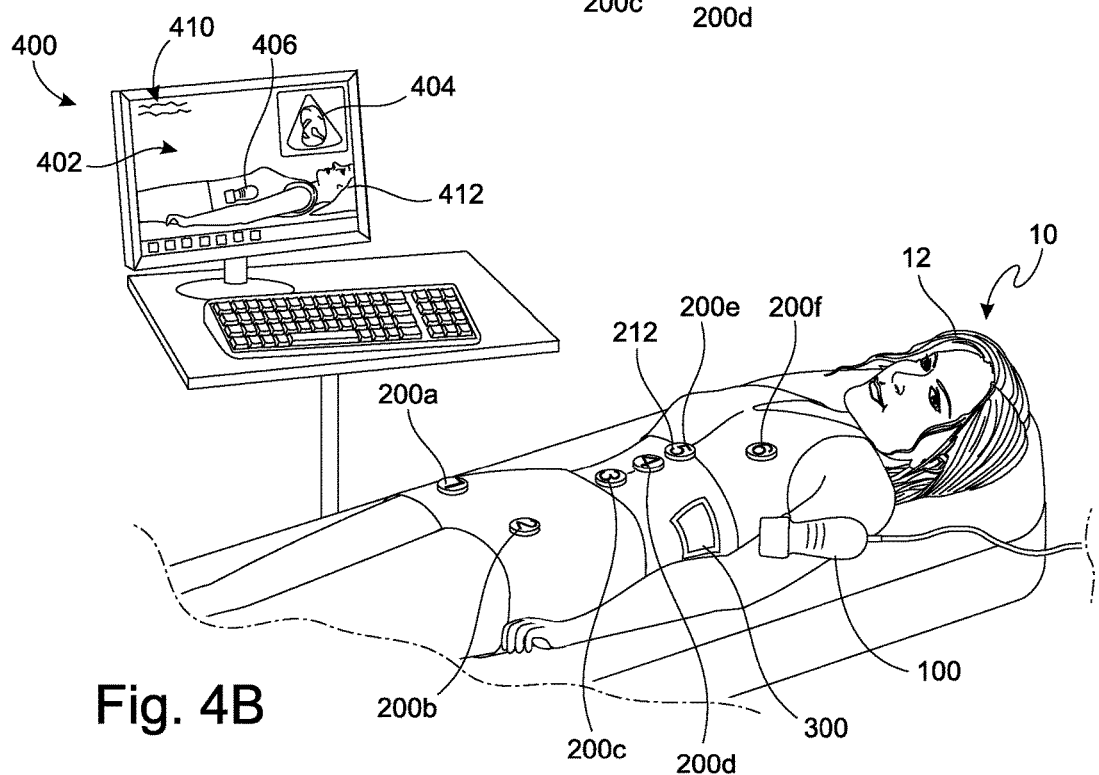

First, the user must place a collection of electronic tags 200*a-g* on different regions on the body 12 of a subject 10. These regions may be pre-defined locations on, for example, a human body or training mannequin. The adhesive layer 204 on the electronic tag 200 keeps the electronic tags 200 attached to the surface and prevents unwanted motion. The transponders 206 are mapped to specific regions on the body (e.g., left shoulder, right thigh, chest, etc.). When the user places the tip 108 of the probe assembly 100 against the electronic tag 200 the RFID reader 104 is placed in close proximity to the transponder layer 202 and the transponder 206 is able to transmit information pertaining to the body part to which it is associated back to the reader 104. As shown in FIGS. 4A-4B, the reader 104 then transmits the information to a computing device 400 where a simulation software can be used to identify where the electronic tag 200 has been placed in relation to the body 12. The computing device 400 then displays a simulated environment 402 showing a virtual subject 412, a virtual probe 406, and an ultrasound image 404 of that area of the body.

The antenna 116 of the RFID reader 104 is positioned within the housing in such a way that the tip 108 of the probe 100 exhibits the highest sensitivity to nearby transponders 202. The probe assembly 100 communicates to a PC or other computing device 400 via a wired or wireless connection, such as USB or Bluetooth. The user can therefore position the probe assembly on a specific region of the body 12 marked with an electronic tag 200 and the software will respond by shifting the focus of the simulation to the corresponding region of the body 12.

The Translation Sensor

Figure 3:
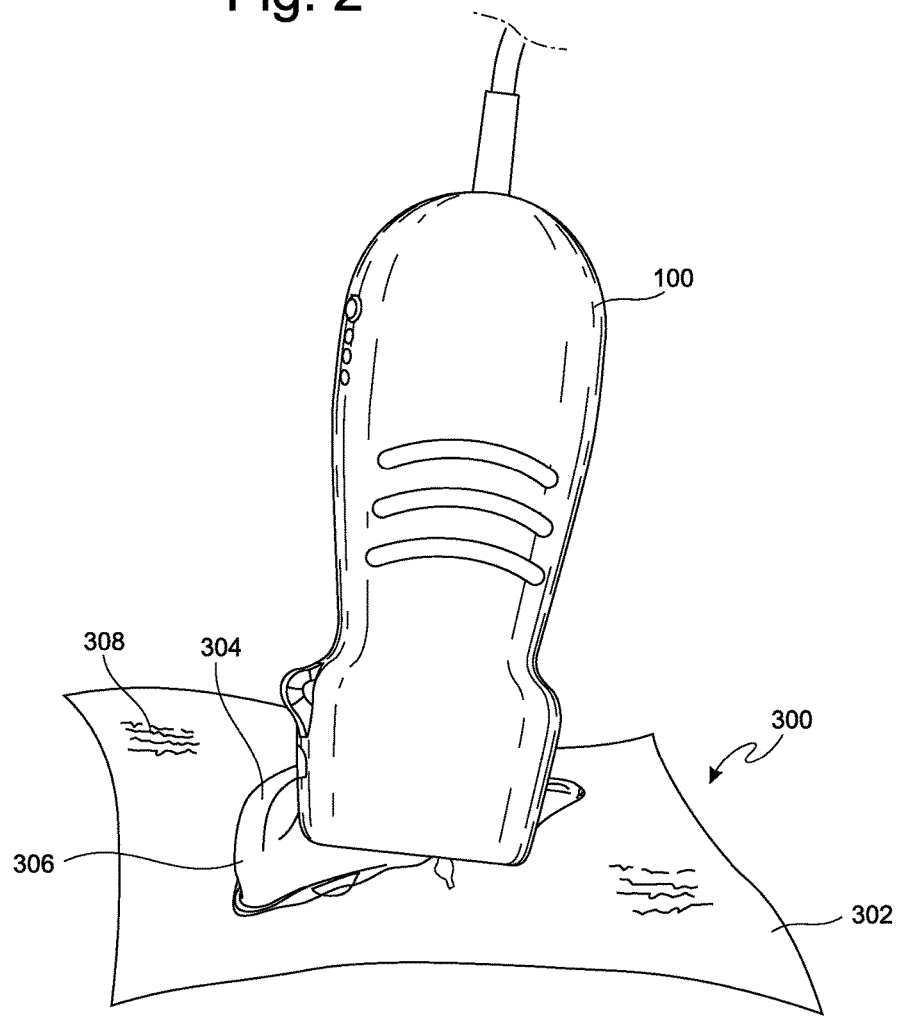
FIG. 3 shows an embodiment of the probe assembly in use with an embodiment of the scanning patch.

Aside from the orientation movement of the probe assembly 100 (i.e. yawing movement, pitching movement, and rolling movement) the system further comprises a translation sensor 300 to detect the translational movement of the probe assembly 100 on selected regions of the body 12, thereby adding two additional degrees of freedom for probe assembly 100 movement detection. In the preferred embodiment, the translation sensor 300 may be in the form of a scanning patch 302 to be applied over an electronic tag 200 on the body 12 of the subject 10 as shown in FIG. 3.

When the user picks a region of anatomy to study in the simulated environment 402, he or she has the option of placing a flexible touch-sensitive, scanning patch 302 on the region of interest as if it were a towel lying on the body. One important feature of the scanning patch 302 is to possess flexibility (bendability) that allows it to conform to the shape of the body 12. Sliding the probe assembly 100 over the scanning patch 302, produces a measurement of translation. By combining the measurement of orientation from the IMU and translation over time, the connected computing device 400 can reconstruct the contour of the curved surface that the user traces with the probe assembly 100. This information can be used to recreate accurate simulated probe movement over a virtual scanning plane in a simulated training environment 402. One advantage of allowing translational motion over a curved surface is that the user can practice sliding the probe 100 over a surface that mimics the physicality of a human body. Care must be taken to build the flexible touch-sensitive scanning patch 302 in such a way that it does not shield the radio frequency waves used by the RFID reader 104 to query the transponders 202.

While still rare, flexible displays can be currently built either using: graphene-based electronics, or electrophoretic screens with flexible electronics bonded on a plastic substrate. Graphene-based solutions have been demonstrated by companies such as Samsung and are commercially available at this time. They result in very light, thin displays that can be bonded with a projected capacitive surface. Electrophoretic flexible screens bonded with a projected capacitive surface are already available commercially and manufactured by several companies including Plastic Logic and Sony/e-Ink.

Some basic operating principles used to build touch-sensitive surfaces include projected capacitive, resistive, and capacitive pressure sensing.

Projected Capacitive

Projected capacitive surfaces are a common solution for tablets and smartphones that must support multi-touch interfaces. For this invention a single-touch-capable component is sufficient. Most projected capacitive surfaces are specifically designed to respond to the typical conductance of human skin. They typically measure how the presence of a finger distorts an electric field generated on top of the surface. In the present invention, the surface must be able to detect contact with a probe assembly 100 made of plastic or other rigid material and detect its position with respect to the origin of the flexible touch surface. It is easy to modify the probe assembly to work with standard touch-sensitive surfaces. For example, the tip of the probe assembly can be covered with a rubbery material that has similar conductance to human skin. The required material is similar to the tips used on low-cost passive styli designed for smartphones. Additionally, given that the probe assembly is designed to resemble a real ultrasound probe, its tip is expected to be either flat or to possess a slight curvature. In order to enhance the experience of controlling the position of the scanning plane in the simulated environment by sliding the probe assembly over the touch surface, one embodiment may include a protruding element 130 at the tip 108 of the probe 100 to create clear point of contact between the probe assembly 100 and the surface as shown in FIG. 1B.

Most commercially available projected capacitive surfaces are bonded over a rigid glass substrate that does not allow flexing. However, a new fabrication process has been made by companies such as Sony, e-Ink, and Plastic Logic that allows the electronic components to be bonded over a flexible plastic substrate. Despite being very new, this technology is already available for OEMs to integrate in commercial products.

Resistive

Resistive touch surfaces typically use a three-layer assembly comprising of: a top conductive layer, an intermediate insulator (typically Indium Tin Oxide), and a bottom conductive layer. When the user applies pressure at a single point over the resistive surface, the insulator layer gets depressed allowing the conductive layers to form a system of variable resistances. By measuring the amount of resistance in each direction over the surface, a microcontroller can determine the position of the touch. One advantage of resistive surfaces over projected capacitive surfaces is that they work with any material and not just human skin.

Resistive surfaces are naturally flexible, but the amount of bending they can tolerate depends on the manufacturing process. If the surface is not designed specifically to withstand the appropriate mechanical stresses, the electronic components may break.

Some resistive surface components are also able to measure the amount of mechanical pressure that is applied on them. The pressure readings can be used to control the amount of compression that the user applies over the patient's body in the simulated environment.

Capacitive Pressure Sensing

Capacitive pressure sensing is realized by bonding an array of miniature capacitors on a conformable surface that hosts the interconnections necessary to relay a reading of capacitance from each of the capacitive elements. Each capacitor is composed of two conductive plates separated by a soft dielectric. When pressure is applied to each capacitive element, the dielectric is compressed causing the distance between the conductive plates to vary inducing a measurable change in capacitance.

Absolute-Position Optical Tracking

In another embodiment, the user may place the scanning patch 302 over the body or training mannequin with a special pattern printed on it. The pattern possesses the property that imaging any region of the pattern allows an algorithm to determine the exact position within the pattern of the imaged patch. As shown in FIG. 1A, tip 108 of the probe assembly 100 may be provisioned with an aperture 132 through which a small high-speed camera can record images of the underlying pattern when the probe assembly 100 is sliding over it. This apparatus allows the computing device to determine the exact position of the probe assembly 100 with respect to the flexible scanning patch 302.

Relative-Position Optical Tracking

As an alternative to the scanning patch 302, the probe assembly 100 may be equipped with the translation sensor 300. Again, the tip 108 of the probe assembly 100 may be provisioned with an aperture 132 through which an optical tracker similar to the integrated components used in computer mice, can detect translational movement. These components use a small, low-resolution, high-speed camera to detect motion over a surface using a simplified form of optical-flow. Alternatively, the optical tracker can be provisioned with one or more laser beams that detect motion using Doppler interferometry. Sliding such probe assembly over the surface of a subject will produce a reading of 2D displacement. This solution can be used to displace the scanning plane from a discrete point in the simulated environment that corresponds to the physical location on the body defined by the corresponding electronic tag 200.

Display Component

If the flexible touch-surface scanning patch 302 is bonded with a flexible display component 304 (enhanced scanning patch), the software can provide additional visual feedback to the user by showing relevant information 306 about the region of the body it is placed on as well as clear indication on how to move the probe over the surface. The user may be instructed to place the enhanced scanning patch over the region of interest. Thus, when the probe assembly 100 is placed over the patch 302, the aforementioned RFID reader 104 can localize both the position of the probe assembly 100 and the patch 302 it is placed on.

Complete System

The IMU combined with the scanning patch allows the system to sense motion over 5 Degrees Of Freedom (DOF): 3-axis rotation, 2-axis translation over a curved surface.

By combining the above with the RFID component within the probe assembly 100, the final system can also localize the region of the body where the motion of the probe occurs. This solution reflects faithfully how an ultrasound operator works, whereby during an examination he or she: scans only a small set of discrete regions of the body (e.g., liver imaging protocol), restricts the extent of the scan to only a small area around the region of interest, restricts the motion of the probe to the surface of the patient's body (a motion over a semi-rigid curved manifold) to maintain good contact between the ultrasound transducer and the body.

Figure 5:
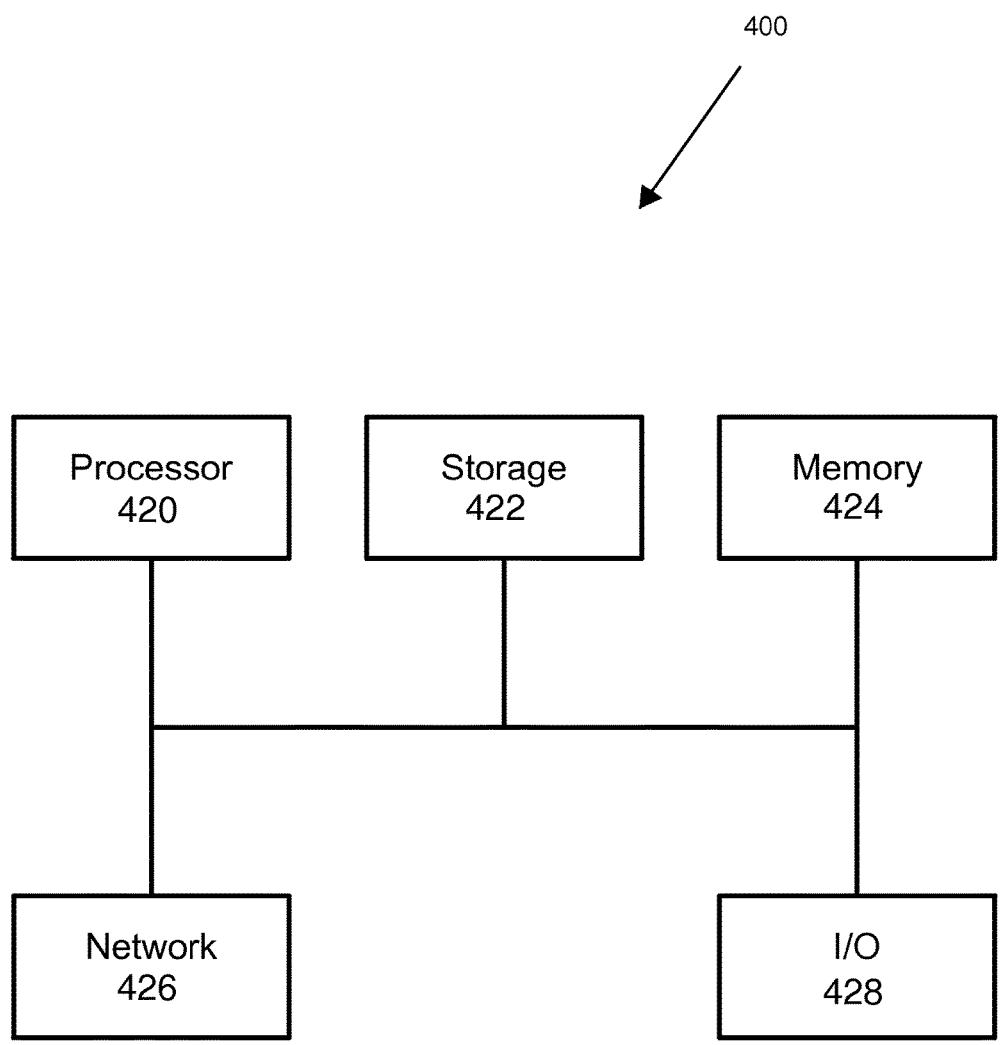
FIG. 5 is a high-level block diagram of the computing device.

A high-level block diagram of an exemplary computing device 400 that may be used to implement systems, apparatus, and methods described herein is illustrated in FIG. 5. The computing device 400 comprises a processor 420 operatively coupled to a data storage device and memory. Processor 420 controls the overall operation of computing device 400 by executing computing device program instructions that define such operations. The computing device program instructions may be stored in data storage device 422, or other non-transitory computing device readable medium, and loaded into memory 424 when execution of the computing device program instructions is desired. Thus, the method steps of the ultrasound simulation software can be defined by the computing device program instructions stored in memory 424 and/or data storage device 422 and controlled by processor 420 executing the computing device program instructions.

Computing device 400 may also includes one or more network interfaces 426 for communicating with other devices via a network. Computing device 400 also includes one or more input/output devices 428 that enable user interaction with computing device 400 (e.g., display, keyboard, touchpad, mouse, speakers, buttons, etc.).

Processor 420 can include, among others, special purpose processors with software instructions incorporated in the processor design and general purpose processors with instructions in storage device 422 or memory 424, to control the processor 420, and may be the sole processor or one of multiple processors of computing device 400. Processor 420 may be a self-contained computing system, containing multiple cores or processors, a bus, memory controller, cache, etc. A multi-core processor may be symmetric or asymmetric. Processor 420, data storage device 422, and/or memory 424 may include, be supplemented by, or incorporated in, one or more application-specific integrated circuits (ASICs) and/or one or more field programmable gate arrays (FPGAs). It can be appreciated that the disclosure may operate on a computing device 400 with one or more processors 420 or on a group or cluster of computing devices networked together to provide greater processing capability.

Data storage device 422 and memory 424 each comprise a tangible non-transitory computing device readable storage medium. By way of example, and not limitation, such non-transitory computing device-readable storage medium can include random access memory (RAM), high-speed random access memory (DRAM), static random access memory (SRAM), double data rate synchronous dynamic random access memory (DDRRAM), read-only memory (ROM), erasable programmable read-only memory (EPROM), electrically erasable programmable read-only memory (EEPROM), flash memory, compact disc read-only memory (CD-ROM), digital versatile disc read-only memory (DVD-ROM) disks, or other optical disk storage, magnetic disk storage or other magnetic storage devices, or any other medium which can be used to carry or store desired program code means in the form of computing device-executable instructions, data structures, or processor chip design. When information is transferred or provided over a network or another communications connection (either hardwired, wireless, or combination thereof) to a computing device, the computing device properly views the connection as a computing device-readable medium. Thus, any such connection is properly termed a computing device-readable medium. Combinations of the above should also be included within the scope of the computing device-readable media.

Network/communication interface 426 enables the computing device 400 to communicate with networks, such as the Internet, also referred to as the World Wide Web (WWW), an intranet and/or a wireless network, such as a cellular telephone network, a wireless local area network (LAN) and/or a metropolitan area network (MAN), and other devices using any suitable communications standards, protocols, and technologies. By way of example, and not limitation, such suitable communications standards, protocols, and technologies can include Ethernet, Wi-Fi (e.g., IEEE 802.11), Wi-MAX (e.g., 802.16), Bluetooth, near field communications ("NFC"), radio frequency systems, infrared, GSM, EDGE, HS-DPA, CDMA, TDMA, quadband, VoIP, IMAP, POP, XMPP, SIMPLE, IMPS, SMS, or any other suitable communications protocols. By way of example, and not limitation, the network interface 426 enables the computing device 400 to transfer data, synchronize information, update software, or perform any other suitable operation.

Input/output devices 428 may include peripherals, such as the probe assembly. Input/output devices 428 may also include monitors or touchscreens for display, a keyboard and mouse for input, speakers for audio output, and other such devices.

Any or all of the systems and apparatus discussed herein, including personal computing devices, tablet computing devices, hand-held devices, cellular telephones, servers, database, cloud-computing environments, and components thereof, may be implemented using a computing device such as computing device 400.

One skilled in the art will recognize that an implementation of an actual computing device or computing device system may have other structures and may contain other components as well, and that FIG. 5 is a high level representation of some of the components of such a computing device for illustrative purposes.

Software Components and Simulation

The simulation software comprises: low-level components to interface with the probe assembly hardware (e.g., device drivers), a graphics engine to display a graphical user interface and additional 3D visual elements (on a 2D screen or stereoscopic display), a mathematical engine, and a database or other storage functionality to host a library of medical cases.

When the user changes the orientation of the probe assembly 100 in physical space, he/she will observe a corresponding motion of the virtual probe 406 on screen. A mathematical algorithm updates the simulated ultrasound image to present an image that mimics how a real ultrasound image would look if the probe were placed on the same location on the body.

As shown in FIGS. 4A-4B, in the preferred embodiment when the user starts, the software is presented with a graphical user-interface 410 that displays: a 3D representation of the human body (virtual body 412), a 3D graphical representation of an ultrasound probe (virtual probe 406) positioned over the virtual body 412, a view of an ultrasound image (simulated ultrasound image 404) corresponding to the scanning plane of the virtual probe 406 intersecting the anatomy of the virtual body 412.

When the user places the probe assembly 100 in close proximity to one of the electronic tags 200*a-g* arranged over a real body or training mannequin, the simulation software will move the virtual probe 406 to the corresponding location on the virtual body 412.

When the user slides the probe assembly 100 over the scanning patch 302 (e.g., flexible touch surface assembly with optional bonded flexible display 304) the virtual probe 406 will displace over the surface of the virtual body 412 mimicking the motion of the user. If the scanning patch 302 also acts as a display, the software can showcase additional information 306 about the region of the body where the scanning patch 302 is located as well as visual guidance or instructions 308 on how to operate the probe assembly correctly.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention not be limited by this detailed description, but by the claims and the equivalents to the claims appended hereto.

The invention claimed is:

1. A system for ultrasound simulation, comprising:
   a) a plurality of electronic tags that are applied to different regions on a body of a subject, each electronic tag comprising:
      i) a surface layer displaying a custom graphic depicting an anatomical body part corresponding to a specific region of the body where the electronic tag is applied,
      ii) an adhesive layer to affix the electronic tag onto the body at the specific region of the body corresponding to the custom graphic depicting the anatomical body part, and
      iii) a transponder layer in between the surface layer and the adhesive layer, the transponder layer comprising a transponder configured to transmit information related to the anatomical body part;
   b) a probe assembly to simulate scanning one of the specific regions of the body having one of the electronic tags, the probe assembly comprising:
      i) a housing having a handle and a tip connected to the handle,
      ii) an electronic tag reader housed in the tip,
      iii) an inertial measurement unit within the housing to detect orientation and movement of the probe assembly, and
      iv) a communication interface for communication with a computing device;
   c) a plurality of scanning patches, each scanning patch having a flexible touch-sensitive surface and a flexible display bonded with the flexible touch-sensitive surface, each scanning patch configured to be applied on the body over one of the plurality of electronic tags, wherein application of the scanning patch on the body causes the scanning patch to conform to the contours of the body, wherein each scanning patch is configured to operate with the probe assembly to provide translational movement information of the probe assembly to the electronic tag reader when the probe assembly is slid over the scanning patch; and
   d) a processor operatively connected to the electronic tag reader, the inertial measurement unit, and the communication interface to process information received by the electronic tag reader and the inertial measurement unit and send the processed information to the computing device via the communication interface to display a simulated environment comprising a virtual body corresponding to the body of the subject, a virtual ultrasound probe that orients and moves according to the orientation and movement of the probe assembly, and a simulated ultrasound image corresponding to the region of the body being scanned to mimic how a real ultrasound image would look like if a real ultrasound probe were placed on a corresponding location on an actual patient.

2. A system for ultrasound simulation, comprising:
a) a probe assembly comprising a housing having a handle and a tip connected to the handle, an electronic tag reader housed in the tip, and an orientation sensor within the housing;
b) an electronic tag comprising, an adhesive layer having a first side and a second side opposite the first side, and a transponder layer affixed to the adhesive layer on the first side, wherein the second side comprises an adhesive to attach the electronic tag to a body of a subject;
c) a scanning patch having a flexible touch-sensitive surface and a flexible display bonded with the flexible touch-sensitive surface, the scanning patch configured to be applied on the body over the electronic tag, wherein application of the scanning patch on the body causes the scanning patch to conform to the contour of the body, wherein the scanning patch is configured to operate with the probe assembly to provide translational movement information of the probe assembly to the electronic tag reader when the probe assembly is slid over the scanning patch; and
d) a processor operatively connected to the electronic tag reader and the orientation sensor to process information received by the electronic tag reader and the orientation sensor and send the processed information to the computing device via a communication interface to display a simulated environment comprising a virtual body corresponding to the body of the subject, a virtual ultrasound probe that orients and moves according to the orientation and movement of the probe assembly, and a simulated ultrasound image corresponding to the region of the body being scanned to mimic how a real ultrasound image would look like if a real ultrasound probe were placed on a corresponding location on an actual patient.

3. The system of claim 2, wherein the orientation sensor is selected from the group consisting of an inertial measurement unit using MEMS components, an electromagnetic unit, an optical unit, and a mechanical unit.

4. The system of claim 2, wherein the flexible touch-sensitive surface is selected from the group consisting of a projected capacitive system, a resistive system, and a capacitive pressure sensing system.

5. The system of claim 2, wherein the scanning patch comprises a printed pattern that allows a computing device to determine a location of the probe assembly with respect to the scanning patch.

6. The system of claim 2, wherein the electronic tag is selected from the group consisting of a radio-frequency identification device, a near field communication device, and a beacon.

7. The system of claim 2, wherein the electronic tag further comprises a surface layer to cover the transponder.

8. The system of claim 7, wherein the surface layer displays a custom graphic depicting an image representing an anatomical body part associated with a region of the body where the electronic tag is attached.

9. The system of claim 8, wherein the electronic tag further comprises a memory storing information related to the anatomical body part associated with the region of the body where the electronic tag is attached, attached, wherein the information can be transmitted to a computing device to generate a simulated environment.

10. A method for simulating use of an ultrasound machine, comprising:
a) attaching at least one electronic tag on a pre-defined location on a subject, wherein the at least one electronic tag comprises information related to an anatomical body part associated with the pre-defined location on the subject where the at least one electronic tag is attached;
b) attaching a scanning patch on the subject over the at least one electronic tag, wherein the scanning patch has a flexible touch-sensitive surface and a flexible display bonded with the flexible touch-sensitive surface, wherein attaching the scanning patch on the subject causes the scanning patch to conform to a contour of the anatomical body part;
c) using a probe assembly to activate the at least one electronic tag by placing the probe assembly on the at least one electronic tag, wherein when the at least one electronic tag is activated by the probe assembly, a system identifies the anatomical body part associated with the predefined location on the subject where the at least one electronic tag is attached, and the electronic tag outputs ultrasound information related to the anatomical body part to display a simulated environment on a screen, wherein the scanning patch is configured to operate with the probe assembly to provide translational movement information of the probe assembly to the electronic tag reader when the probe assembly is slid over the scanning patch;
d) moving the probe assembly along the scanning patch, wherein the ultrasound information outputted corresponds with the movement of the probe assembly such that the ultrasound information replicates images that would be seen in an actual ultrasound of the anatomical body part based on the movement, wherein a processor operatively connected to an electronic tag reader and an orientation sensor in the probe assembly processes information received by the electronic tag reader and the orientation sensor and sends the processed information to the computing device via a communication interface to display a simulated environment comprising a virtual body corresponding to the body of the subject, a virtual ultrasound probe that orients and moves according to the orientation and movement of the probe assembly, and a simulated ultrasound image corresponding to the region of the body being scanned to mimic how a real ultrasound image would look like if a real ultrasound probe were placed on a corresponding location on an actual patient, whereby a user gains experience on how to use the ultrasound machine.

11. The method of claim 10, wherein the movement of the probe assembly is detected by an inertial measurement unit (IMU) that measures an orientation of the probe assembly with respect to a gravity vector.

12. The method of claim 11, wherein the IMU measures yaw, pitch, and roll angles of the probe assembly measured over time which correspond to fanning, rocking, and rolling, respectively, during use of the ultrasound machine, wherein the yaw, pitch, and roll angle measurements are used in creating the simulated environment.

13. The method of claim 12, wherein sliding the probe assembly over the scanning patch produces a measurement of translation, which is used in creating the simulated environment.

14. The method of claim 13, wherein the system generates a graphical user-interface that displays a 3D representation of the human body (virtual body), a 3D representation of an ultrasound probe positioned over the virtual body (virtual probe), and an ultrasound image corresponding to a scanning plane of the virtual probe intersecting the virtual body (simulated ultrasound image).

15. The method of claim 14, wherein when the user places the probe assembly in close proximity to the at least one electronic tag, the system will move the virtual probe to the corresponding location on the virtual body.

16. The method of claim 15, wherein when the user slides the probe assembly over the scanning patch, the virtual probe will displace over the surface of the virtual body mimicking the motion of the user.

17. The method of claim 16, wherein the system displays additional information about the anatomical body being scanned.

18. The method of claim 17, wherein the system further provides instructions on how to operate the probe assembly correctly.

* * * * *